United States Patent [19]

Wallace et al.

[11] Patent Number: 5,353,772
[45] Date of Patent: Oct. 11, 1994

[54] CARBURETOR FUEL CHARGE HEATING APPARATUS

[76] Inventors: William K. Wallace; Florence W. Wallace, both of P.O. Box 1436, Pahoa, Hi. 96778

[21] Appl. No.: 138,722

[22] Filed: Oct. 20, 1993

[51] Int. Cl.⁵ .............................................. F02M 31/00
[52] U.S. Cl. ................................. 123/545; 123/585; 123/590; 261/44
[58] Field of Search ................ 123/545, 546, 547, 590, 123/585; 261/144, 145; 48/189.2, 189.3

[56] References Cited

U.S. PATENT DOCUMENTS

| | | | |
|---|---|---|---|
| 4,137,875 | 2/1979 | Medina | 123/585 |
| 4,200,070 | 4/1980 | Racine | 123/547 |
| 4,286,564 | 9/1981 | Van Tuyl | 123/545 |
| 4,300,513 | 11/1981 | Ray | 261/144 |
| 4,355,623 | 10/1982 | Graham | 123/590 |
| 4,478,198 | 10/1984 | Bruhn | 123/545 |
| 4,770,151 | 9/1988 | Finlay | 48/189.2 |
| 5,040,518 | 8/1991 | Hamm | 123/545 |
| 5,046,475 | 9/1991 | Thompson | 48/189.3 |

Primary Examiner—Tony M. Argenbright
Assistant Examiner—M. Macy
Attorney, Agent, or Firm—E. Michael Combs

[57] ABSTRACT

An apparatus including a first chamber in operative communication with a carburetor to receive carburetor fluid flow therefrom, directing such fluid flow through a central conduit into a second chamber in operative fluid communication with an intake manifold of an associated internal combustion engine, such that the central conduit is arranged for the heating and associated gaseous flow from the carburetor to the intake manifold.

8 Claims, 4 Drawing Sheets

CARBURETOR FUEL CHARGE HEATING APPARATUS

BACKGROUND OF THE INVENTION

1. Field of the Invention

The field of invention relates to carburetor apparatus, and more particularly pertains to a new and improved fuel charge heating apparatus wherein the same is directed to the heating of a fuel charge between a carburetor and an associated intake manifold of an internal combustion engine.

2. Description of the Prior Art

Carburetor apparatus of various types are indicated in the prior art, wherein air fuel ratio control such as indicated in U.S. Pat. No. 4,563,991, a structure to elevate a fuel mixture as indicated in U.S. Pat. No. 5,123,398; and fuel control structure as indicated in U.S. Pat. No. 4,846,133 are available in the prior art.

The instant invention attempts to overcome deficiencies of the prior art by providing for a readily retrofitted and effective construction arranged to preheat a fuel mixture charge directed from the carburetor to an associated intake manifold and in this respect, the present invention substantially fulfills this need.

SUMMARY OF THE INVENTION

In view of the foregoing disadvantages inherent in the known types of carburetor apparatus now present in the prior art, the present invention provides a fuel charge heating apparatus wherein the same is directed to enhance the heating of a carburetor fuel charge between the carburetor and associated intake manifold directing a gaseous mixture into an associated internal combustion engine. As such, the general purpose of the present invention, which will be described subsequently in greater detail, is to provide a new and improved fuel charge heating apparatus which has all the advantages of the prior art carburetor apparatus and none of the disadvantages.

To attain this, the present invention provides an apparatus including a first chamber in operative communication with a carburetor to receive carburetor fluid flow therefrom, directing such fluid flow through a central conduit into a second chamber in operative fluid communication with an intake manifold of an associated internal combustion engine, such that the central conduit is arranged for the heating and associated gaseous flow from the carburetor to the intake manifold.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto, Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fuel charge heating apparatus which has all the advantages of the prior art carburetor apparatus and none of the disadvantages.

It is another object of the present invention to provide a new and improved fuel charge heating apparatus which may be easily and efficiently manufactured and marketed.

It is a further object of the present invention to provide a new and improved fuel charge heating apparatus which is of a durable and reliable construction.

An even further object of the present invention is to provide a new and improved fuel charge heating apparatus which is susceptible of a low cost of manufacture with regard to both materials and labor, and which accordingly is then susceptible of low prices of sale to the consuming public, thereby making such fuel charge heating apparatus economically available to the buying public.

Still yet another object of the present invention is to provide a new and improved fuel charge heating apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
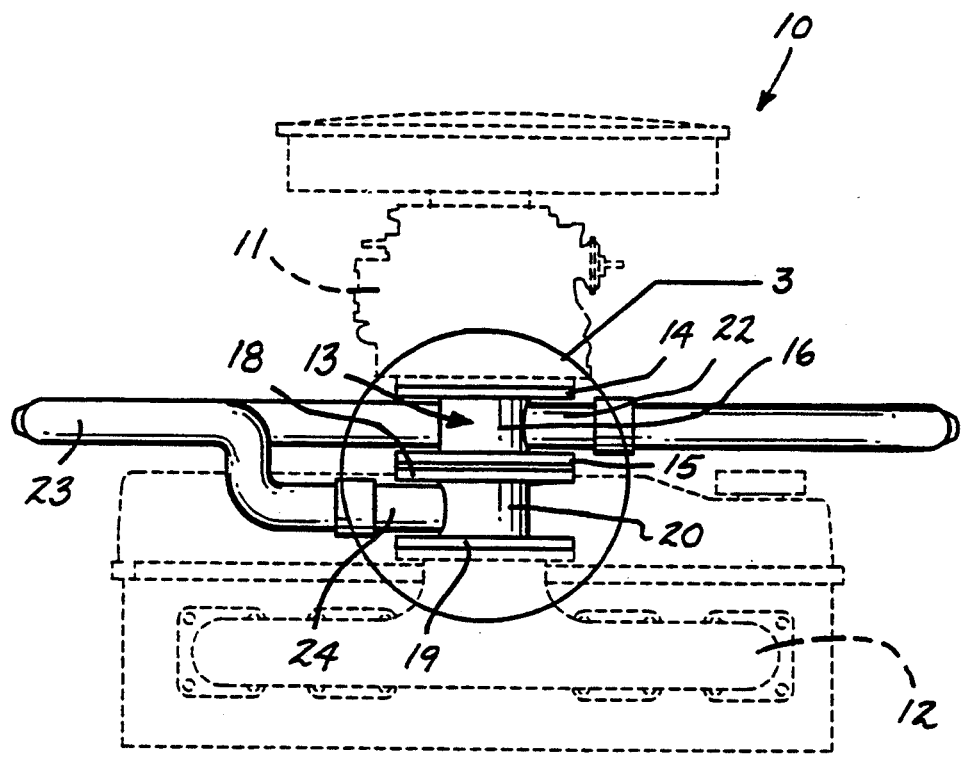
FIG. 1 is an orthographic side view of the invention.

With reference now to the drawings, and in particular to FIGS. 1 to 9 thereof, a new and improved carburetor fuel charge heating apparatus embodying the principles and concepts of the present invention and generally designated by the reference numerals 10 and 10a will be described.

More specifically, the fuel charge heating apparatus 10 of the instant invention essentially comprises, as indicated in FIG. 1, a carburetor or throttle body fuel injector 11 in fluid communication with an intake manifold 12 through the apparatus 10. A first chamber housing 13 having a first housing top flange 14 spaced from a first housing bottom flange 15 is provided secured together by a first housing side wall 16 extending between the first housing top and bottom flanges 14 and 15. Mounted below the first chamber housing 13 is a second chamber housing 17, in turn having a second chamber housing top flange 18 spaced from a second chamber bottom flange 19 secured together by a second chamber housing side wall 20. An impermeable block-off plate 21 is mounted between the first housing bottom flange 15 and the second housing top flange 18. A first tube 22 is directed into the first chamber housing 13 through the first housing side wall 16, with a second tube 24 directed into the second chamber housing 17 through the second housing side wall 20, with the first and second tubes 22 and 24 in a fluid flow communication together relative to one another by a central conduit 23 having a predetermined diameter. A venturi tube 25, as illustrated in FIG. 2, is employed, where the venturi tube is arranged to have a constricted portion having a predetermined width less than the predetermined diameter to enhance fluid flow and associated turbulence within the central conduit.

An air supply tube 26 is directed in pneumatic communication with the central conduit 23 and specifically, the air supply tube 26 is positioned in adjacency to the first tube 22. In this manner, the air supply tube 26 is provided with a valve 26a to permit the directing of additional air by venturi force into the central conduit 23 to thereby permit the controlling of the air-fuel mixture to provide for leaning of the mixture or permitting its enrichment. The air supply tube 26 may be directed to a source of heated air if desired employing electrical resistance heating and the like, as well as directing such heated air from the exhaust manifold structure but in any event, the primary purpose of the air supply tube 26 and its associated valve 26a is to permit the controlling of the air-fuel mixture throughout the central conduit 23 to be directed into the second chamber housing 17. Due to the extended length and spacing of the source of fuel, be it a throttle body fuel injector system or a carburetor, the extreme length of the source of fuel requires the availability of air-fuel mixture control. It should be noted that additionally electrical resistance heaters may be employed about the central conduit if required.

Figure 5:
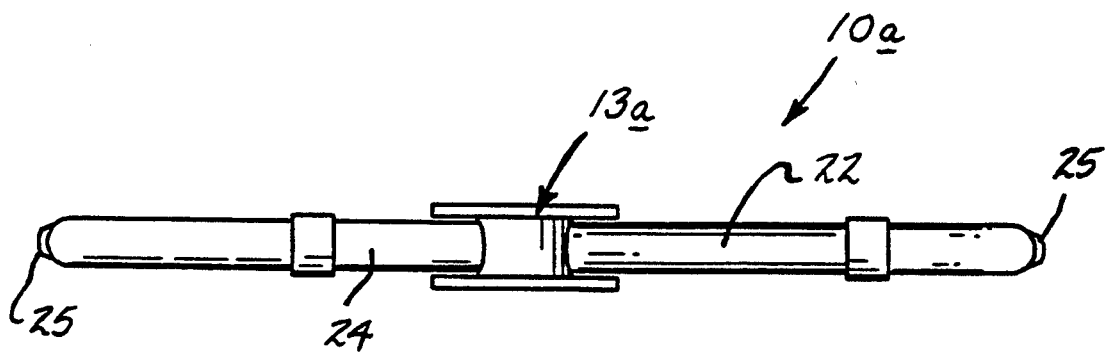
FIG. 5 is an orthographic side view of a modified aspect of the invention.
Figure 6:
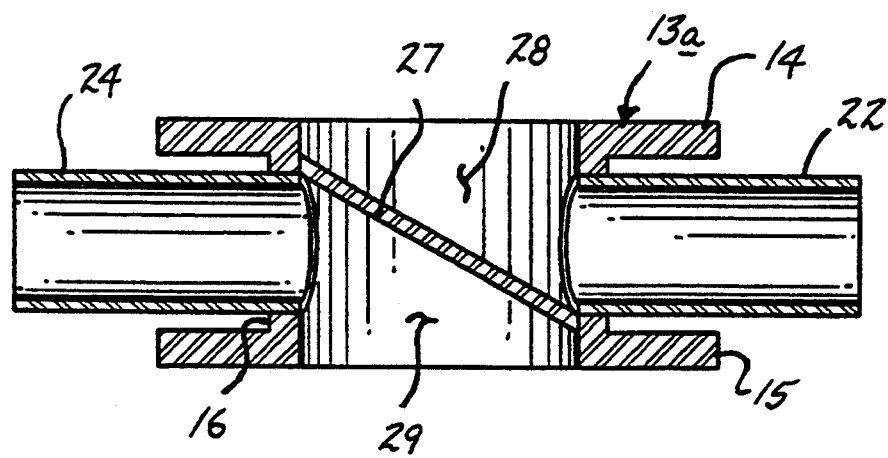
FIG. 6 is an orthographic cross-sectional illustration of the modified chamber housing having a separation plate to effect division relative to a first and second chamber.

The apparatus 10a, as illustrated in FIG. 5, includes a modified chamber housing 13a that is arranged to provide for separated first and second chambers 28 and 29 (see FIG. 6) divided by a separation plate 27 extending from the top flange 14 to the bottom flange 15, wherein the first tube 22 is in fluid flow communication with the first chamber, while the second tube 24 is in fluid flow communication with the second chamber 29. A low profile model is employed where a relatively low hood clearance is available within an associated automotive engine compartment.

Figure 2:
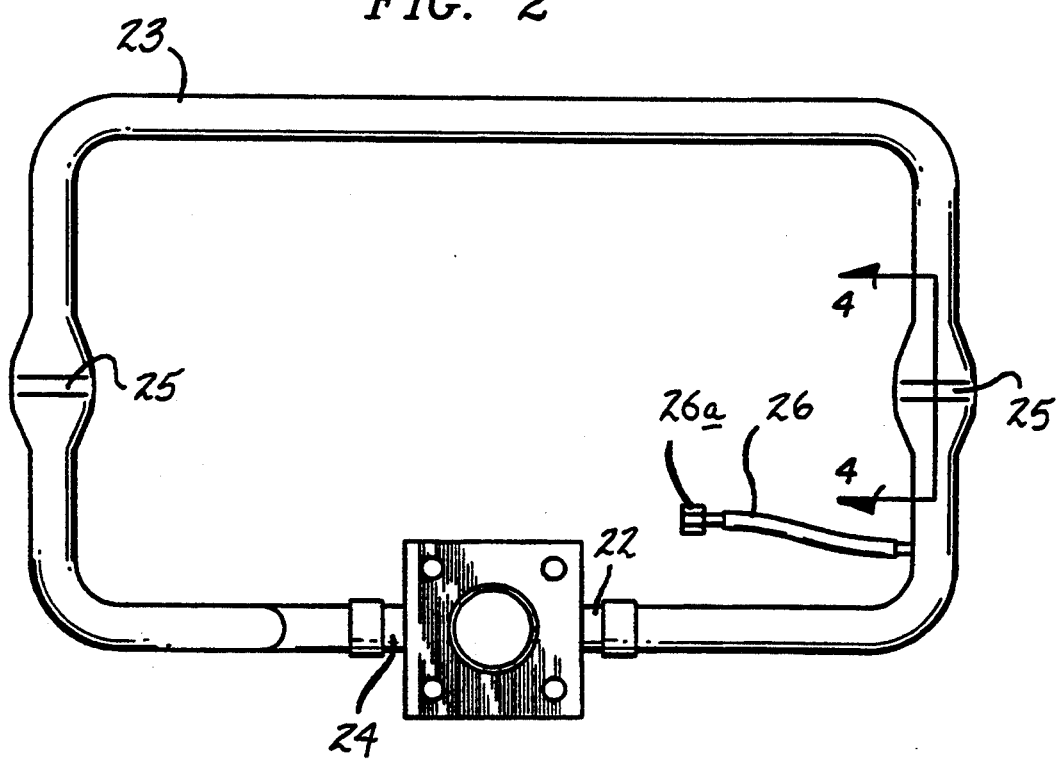
FIG. 2 is an orthographic top view of the invention.
Figure 3:
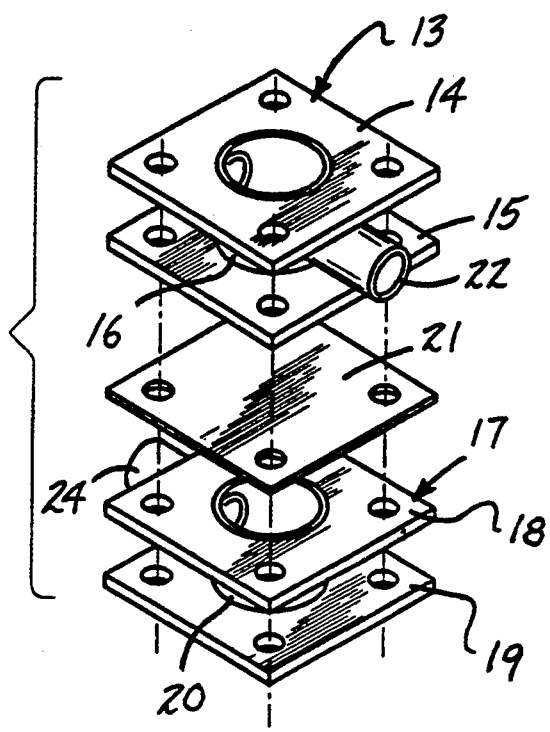
FIG. 3 is an isometric illustration of the first and second chambers for cooperation relative to one another.
Figure 4:
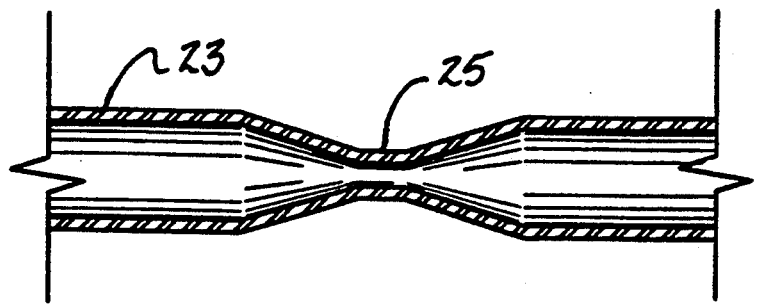
FIG. 4 is an orthographic view, taken along the lines 4—4 of FIG. 2 in the direction indicated by the arrows.
Figure 7:
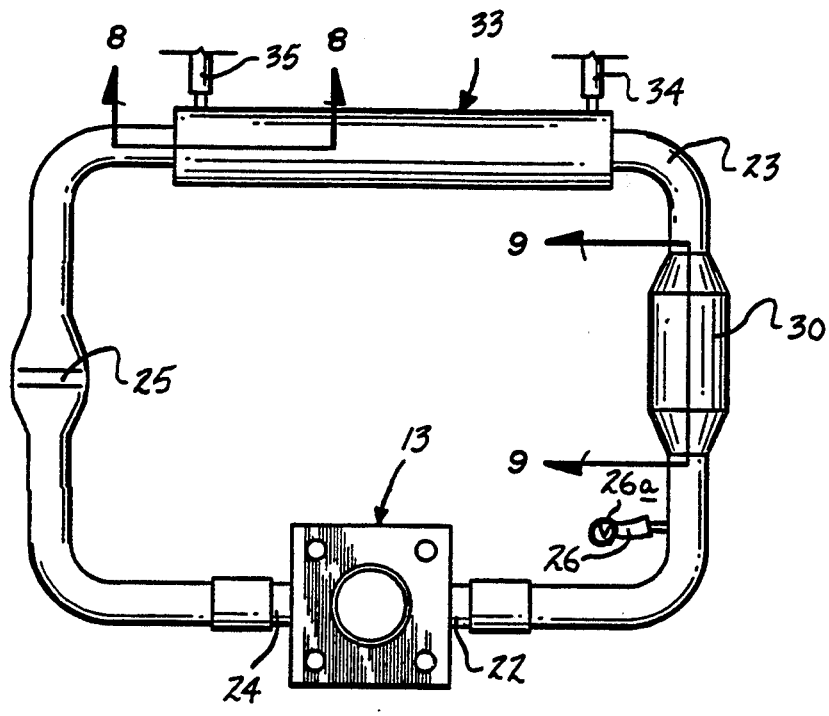
FIG. 7 is an orthographic top view of the invention, as indicated in FIG. 1, to further include a baffle chamber as well as heat exchanger housing mounted about the central conduit between the first and second chamber housings.
Figure 8:
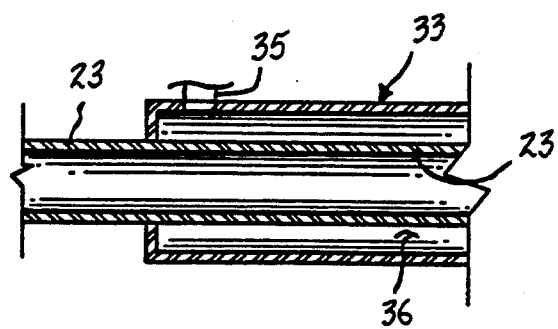
FIG. 8 is an orthographic view, taken along the lines 8—8 of FIG. 7 in the direction indicated by the arrows.
Figure 9:
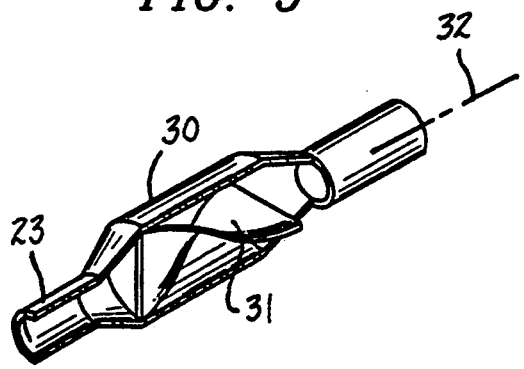
FIG. 9 is an orthographic view, taken along the lines 9—9 of FIG. 8 in the direction indicated by the arrows.

The FIG. 7 indicates the apparatus 10 to further employ, in addition to the structure as indicated in FIG. 2 for example, a baffle chamber 30, where it is indicated in FIG. 9 to include a helical baffle plate 31 concentrically oriented within the baffle chamber 30 about an axis 32 about which the baffle chamber 30 is oriented to provide for the swirling and thereby enhancing of turbulence within the central conduit 23 to enhance heat exchange of the gaseous mixture within the central conduit 23. Further, to enhance the gasification of such fluid flow through the central conduit 23, a fluid heat exchanger housing 33 is provided about the central conduit 23 to include a heated fluid reservoir 36 in surrounding relationship about the central conduit 23 within the heat exchange housing 33, wherein a fluid outlet tube 34 cooperates with a fluid inlet tube 35 typically cooperative with the heated water jacket fluid of the associated internal combustion engine and may be obtained from one of the radiator hose fittings such as typically the inlet hose into the radiator to receive water therefrom to obtain water a higher temperature gradient relative to its being directed into the heated fluid reservoir 36. It should be understood that throughout the conduit structure to include the conduits 23, 24, and the like, it is preferred that the use of copper or copper alloy be employed throughout as providing the greatest heat exchange in the conduction of heat within the conduit structure to enhance the gasification within the conduit structure and thereby enhance efficiency of operation of the organization.

While it was noted that only in FIG. 2 that a plurality of venturi tubes 25 were employed, it is desirable that a plurality of such venturi tubes be employed throughout the central conduit structure to enhance and maintain gasification of the mixture by periodically increasing velocity throughout the central conduit structure. The enhanced turbulence to this effect enhances the fuel and air mixing and further enhances heat scavenging from the tubing structure itself and the employment of the copper piping further enhances the efficiency and operation of the device. The invention requires the enhanced gasification of the fuel and air mixture and accordingly by adjusting the air and fuel ratio through the air supply tube 26 and its associated valves 26a, efficiency of the organization may be adjusted to accommodate various driving conditions at various elevations, temperature zones, and the like.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT Of the United States is as follows:

1. A fuel charge heating apparatus for positioning between a carburetor and an intake manifold, wherein the apparatus comprises,
   a first chamber housing and a second chamber housing, the first chamber housing including a first housing top flange spaced from a first chamber bottom flange and a first housing side wall extending between the first housing top flange and first housing bottom flange, the second chamber housing having a second housing top flange spaced from a second housing bottom flange, and a second housing bottom wall extending between the second housing top flange and the second housing bottom flange, and
   an impermeable block-off plate mounted coextensively between the first housing bottom flange and the second housing top flange, with a central conduit extending between the first chamber housing and the second chamber housing.

2. An apparatus as set forth in claim 1 wherein the first housing side wall includes a first tube, and the second housing side wall includes a second tube, with the central conduit extending in operative communication between the first tube and the second tube.

3. An apparatus as set forth in claim 2 wherein the central conduit is arranged to have a predetermined diameter with the central conduit further including at least one venturi tube mounted within the central conduit, with the venturi tube having a predetermined width less than the predetermined diameter.

4. An apparatus as set forth in claim 3 including an air supply tube in pneumatic communication with the central conduit, the air supply tube including a valve to control air volume directed through the air supply tube into the central conduit.

5. An apparatus as set forth in claim 4 wherein the central conduit further includes a baffle chamber, the baffle chamber having a central tube directed therethrough, and the baffle chamber symmetrically oriented about a predetermined axis, and a helical baffle plate positioned within the baffle chamber to effect turbulence of fluid flow within the baffle chamber.

6. An apparatus as set forth in claim 5 wherein the central conduit further includes a fluid heat exchange housing mounted about the central conduit spaced from the venturi tube and the baffle chamber, wherein the fluid heat exchange housing includes a heated fluid reservoir having a fluid inlet tube and a fluid outlet tube to receive heated fluid flow through the heated fluid reservoir, and the heated fluid reservoir is arranged in surrounding relationship relative to the central conduit within the fluid heat exchange housing.

7. An apparatus as set forth in claim 6 wherein the central conduit is formed of copper.

8. An apparatus as set forth in claim 5 wherein the central conduit is formed of a copper alloy.

* * * * *